United States Patent
Izawa et al.

(10) Patent No.: US 9,175,410 B2
(45) Date of Patent: Nov. 3, 2015

(54) OXYGEN GAS DIFFUSION CATHODE, ELECTROLYTIC CELL EMPLOYING SAME, METHOD OF PRODUCING CHLORINE GAS AND METHOD OF PRODUCING SODIUM HYDROXIDE

(75) Inventors: Yuki Izawa, Fujisawa (JP); Setsuro Ogata, Fujisawa (JP); Masaharu Uno, Yokohama (JP); Masashi Tanaka, Fujisawa (JP)

(73) Assignees: PERMELEC ELECTRODE LTD. (JP); KANEKA CORPORATION (JP); TOAGOSEI CO., LTD. (JP); CHLORINE ENGINEERS CORP., LTD. (JP)

( * ) Notice: Subject to any disclaimer, the term of this patent is extended or adjusted under 35 U.S.C. 154(b) by 524 days.

(21) Appl. No.: 13/580,003

(22) PCT Filed: Feb. 15, 2011

(86) PCT No.: PCT/JP2011/053107
§ 371 (c)(1),
(2), (4) Date: Oct. 25, 2012

(87) PCT Pub. No.: WO2011/102331
PCT Pub. Date: Aug. 25, 2011

(65) Prior Publication Data
US 2013/0037415 A1 Feb. 14, 2013

(30) Foreign Application Priority Data
Feb. 22, 2010 (JP) .................................. 2010-035847

(51) Int. Cl.
*C25B 1/34* (2006.01)
*C25B 11/03* (2006.01)

(52) U.S. Cl.
CPC ................. *C25B 11/035* (2013.01); *C25B 1/34* (2013.01); *Y02E 60/366* (2013.01)

(58) Field of Classification Search
USPC .......................................................... 204/284
See application file for complete search history.

(56) References Cited

U.S. PATENT DOCUMENTS

| 4,486,276 A | 12/1984 | Cohn et al. ........................ 204/98 |
| 4,636,274 A | 1/1987 | Gruver et al. .................. 156/279 |

(Continued)

FOREIGN PATENT DOCUMENTS

| CN | 101240426 A | 8/2008 |
| GB | 2 161 833 A | 1/1986 |

(Continued)

OTHER PUBLICATIONS

International Search Report mailed Apr. 26, 2011 in corresponding PCT International Application No. PCT/JP2011/053107.

(Continued)

*Primary Examiner* — Arun S Phasge
(74) *Attorney, Agent, or Firm* — Ostrolenk Faber LLP

(57) ABSTRACT

The current invention is to provide an oxygen gas diffusion cathode for brine electrolysis which reduces an initial electrolysis voltage and is excellent in the durability against short-circuit, and an electrolytic cell and an electrolytic method using the same. The oxygen gas diffusion cathode for brine electrolysis includes a gas diffusion layer 13 and a reaction layer 14 on one surface of an electro-conductive substrate 12, and an electro-conductive layer 15 on the opposite surface thereof. The present oxygen gas diffusion cathode reduces the resistance of the electro-conductive substrate 12 and supplies uniform current by mounting the electro-conductive layer 15.

10 Claims, 2 Drawing Sheets

(56) References Cited

U.S. PATENT DOCUMENTS

| | | | |
|---|---|---|---|
| 2004/0256223 A1* | 12/2004 | Katayama et al. | 204/284 |
| 2005/0106450 A1 | 5/2005 | Castro et al. | 429/44 |
| 2006/0175195 A1 | 8/2006 | Yamada et al. | 204/290.14 |
| 2007/0212594 A1 | 9/2007 | Takasu et al. | 429/44 |
| 2008/0116063 A1 | 5/2008 | Yamada | 204/284 |
| 2008/0271847 A1 | 11/2008 | Katayama et al. | 156/327 |

FOREIGN PATENT DOCUMENTS

| | | |
|---|---|---|
| JP | 5-311475 | 11/1993 |
| JP | 9-041180 | 2/1997 |
| JP | 11-050289 | 2/1999 |
| JP | 2001-009278 | 1/2001 |
| JP | 3553775 | 8/2004 |
| JP | 2004-353064 | 12/2004 |
| JP | 2006-219694 | 8/2006 |
| JP | 2007-005126 | 1/2007 |
| JP | 2008-127631 | 6/2008 |

OTHER PUBLICATIONS

"Domestic and International Situations on Oxygen Cathode for Brine Electrolysis," Soda and Chlorine, vol. 45, pp. 85-108, (1994). (See p. 3 of the specification for statement of relevance).

Supplementary Search Report dated Jan. 20, 2014 issued in corresponding European Patent Application No. 11744617.9 (7 pages).

\* cited by examiner

OXYGEN GAS DIFFUSION CATHODE, ELECTROLYTIC CELL EMPLOYING SAME, METHOD OF PRODUCING CHLORINE GAS AND METHOD OF PRODUCING SODIUM HYDROXIDE

CROSS-REFERENCE TO RELATED APPLICATIONS

The present application is a 35 U.S.C. §§371 national phase conversion of PCT/JP2011/053107, filed Feb. 15, 2011, which claims priority of Japanese Patent Application No. 2010-035847, filed Feb. 22, 2010, the contents of which are incorporated herein by reference. The PCT International Application was published in the Japanese language.

TECHNICAL FIELD

The present invention relates to an oxygen gas diffusion cathode employed in the brine electrolysis industry, an electrolytic cell employing the above cathode, a method of producing chlorine gas and a method of producing sodium hydroxide.

PRIOR ART

Availability of Oxygen Gas Diffusion Cathode in Industrial Electrolysis

In recent years, the availability of an oxygen gas diffusion cathode in the industrial electrolysis has been examined. For example, a hydrophobic cathode for an oxygen reduction reaction is utilized in an apparatus of electrolytically producing hydrogen peroxide. In the alkali production and the acid or alkali recovery, a hydrogen-oxidation reaction on the anode (hydrogen anode) in place of the oxygen production reaction, or an oxygen-reduction reaction on the cathode (oxygen cathode) in place of the hydrogen production is conducted by using the gas diffusion cathode for reducing the power consumption. The possibility of depolarization is reported by the hydrogen anode acting as a counter electrode for metal recovery such as zinc electrowinning, and for galvanization.

Caustic soda (sodium hydroxide) and chlorine which are important industrial raw materials are produced mainly by means of brine electrolysis. This electrolytic process has been converted from a mercury method employing a mercury cathode into an ion exchange membrane method employing an ion exchange membrane as a diaphragm and an active cathode with a smaller overvoltage via a diaphragm method employing an asbestos diaphragm and a soft iron cathode. During the conversion, the electric power consumption rate required for the production of one ton of sodium hydroxide has been reduced as low as to 2000 kWh. Since, however, the sodium hydroxide production accompanies higher power consumption, further reduction of the electric power consumption rate is requested.

Anode and cathode reactions in the conventional electrolytic process are specified as Equations (1) and (2), respectively, and a theoretical decomposition voltage amounts to 2.19 V.

  (1)

  (2)

Employment of the oxygen gas diffusion cathode in place of a hydrogen evolving cathode makes the above reactions into another reaction specified as Equation (3), and its theoretical voltage can be reduced by 1.23 V. About 0.8 V of the cell voltage can be reduced in the practical current density range. The reduction of 700 kwh per one ton of the sodium hydroxide with respect to the electric power consumption rate can be expected.

  (3)

The commercialization of the brine electrolysis process employing the oxygen gas diffusion cathode has been examined since 1980's. For realizing the above process, the development of the oxygen gas diffusion cathode with higher performance and sufficient stabilities in the electrolysis system is indispensable.

Non-Patent Publication 1 describes the oxygen gas diffusion cathode in the brine electrolysis in detail.

[Oxygen Gas Diffusion Cathode for Brine Electrolysis]

The electrolytic cell for brine electrolysis which is operated most commonly and employs the oxygen gas diffusion cathode includes an anode chamber disposed on the anode side of an ion exchange membrane, a catholyte chamber (soda chamber) on the cathode side of the ion exchange membrane, the oxygen gas diffusion cathode in contact with the catholyte chamber and an oxygen gas chamber on the rear surface thereof, wherein raw material oxygen is supplied to the oxygen gas chamber behind the oxygen gas diffusion cathode. This cell is referred to as a three-chamber electrolytic cell because the cell is composed of the anode chamber, the catholyte chamber and the oxygen gas chamber. The oxygen gas supplied to the oxygen gas chamber diffuses in the oxygen gas diffusion cathode for reacting with water and sodium ion in the catholyte chamber, on a catalyst layer in the oxygen gas diffusion cathode, thereby producing sodium hydroxide. Accordingly, the oxygen gas diffusion cathode used in the three-chamber electrolytic cell must operate in a so-called gas-liquid separation manner in which the cathode allows to pass only the oxygen sufficiently through itself and sodium hydroxide solution is not leaked to the oxygen gas chamber. The oxygen gas diffusion cathode which is proposed for satisfying these requirements is composed of an electrode substrate which is prepared by shaping the mixture of carbon powders and PTFE to a sheet-shape and supporting a catalyst such as silver and platinum thereon.

The oxygen gas diffusion cathode employed in this type of the electrolysis is required to have the gas-liquid separating ability. The reduction of the hydrophobicity and the exhaustion of the carbon powders employed in the oxygen gas diffusion cathode proceed with the continuation of the electrolysis so that an amount of the sodium hydroxide leakage from the catholyte chamber to the oxygen gas chamber gradually increases. Problems arise, due to the proceed of the leakage, with respect to the reduction of the amount of the sodium hydroxide produced in the catholyte chamber and to the corrosion of the oxygen gas chamber because of the leaked sodium hydroxide. Since this sodium hydroxide leakage depends on the liquid pressure (height) of the catholyte chamber, its prevention is difficult, especially, in a larger electrolytic cell.

A new electrolytic cell is proposed for solving these problems. In this electrolytic cell, the oxygen gas diffusion cathode is disposed in contact with the ion exchange membrane (zero-gap structure), oxygen gas, a mixture of oxygen gas and water or water vapor is supplied to the rear of the oxygen gas diffusion cathode as raw material, and sodium hydroxide produced is recovered at the rear or the bottom of the oxygen gas diffusion cathode. This type of electrolytic cell resolves the leakage problem of the sodium hydroxide, and eliminates the necessity of separation between the catholyte chamber (caustic chamber) and the oxygen gas chamber required in a three-camber electrolytic cell. This type of the electrolytic cell is referred to as a two-chamber electrolytic cell because the cell is composed of two chambers including one chamber (cathode chamber) which functions as both of the oxygen gas chamber and the catholyte chamber (caustic chamber) of the three-chamber electrolytic cell, and an anode chamber.

The functions required for the oxygen gas diffusion cathode suitable for the electrolytic process employing the two-chamber electrolytic cell are significantly different from those required for the three-chamber electrolytic cell. In the two-chamber electrolytic cell, the cathode chamber is formed by the integration of the catholyte chamber and the oxygen gas chamber, and the sodium hydroxide is produced at the rear of the oxygen gas diffusion cathode in the cathode chamber. In order to recover the sodium hydroxide solution produced at the rear or the bottom of the cathode chamber, the gas diffusion cathode employed in the two-chamber electrolytic cell is required to have gas-liquid permeability, and the gas-liquid separation of the catholyte chamber (caustic chamber) from the oxygen gas chamber is no further required. Because of this reason, the increase in size of the two-chamber electrolytic cell is rather easily realized than that of the three-chamber electrolytic cell, which has been a problem in the latter cell.

Even in case of the gas-liquid permeable oxygen gas diffusion cathode, the sodium hydroxide produced moves along a vertical direction by gravity as well as toward the rear of the cathode so that the sodium hydroxide solution remains inside the cathode to problematically prevent the oxygen supply when the sodium hydroxide is excessively produced. The oxygen gas diffusion cathode is required to concurrently possess the sufficient gas permeability, the sufficient hydrophobicity for averting the wetting with the sodium hydroxide solution, and the hydrophilicity for easily permeating the sodium hydroxide solution through the electrode. In order to satisfy this requirement, Patent Publication 1 proposes a hydrophilic layer disposed between the ion exchange membrane and the electrode.

An electrolytic cell which falls in an intermediary category between the above electrolytic cells is developed. In the electrolytic cell, a gas-liquid permeable oxygen gas diffusion cathode and a membrane are disposed with a small gap therebetween and an alkali solution is allowed to fall down in the gap (Patent Publication 2).

Separately from the improvement of the electrolytic cells, studies on an electrode catalyst and a substrate are ongoing aggressively.

Patent Publication 3 proposes an oxygen gas diffusion cathode composed of, in a mesh structure made of a foam metal, a reaction layer consisting of fine and liquid-permeable hydrophilic portions and fine hydrophilic portions to which gas is easily accessible, which are mixed and in contact with each other; and/or a gas diffusion layer consisting of fine hydrophilic portions to which gas is easily accessible. Patent Publication 4 proposes an oxygen gas diffusion cathode composed of an electro-conductive porous member, a gas supply layer formed in part of the electro-conductive porous member, and a reaction layer in contact with the gas supply layer on one surface. In this oxygen gas diffusion cathode, the other surface of the electro-conductive porous member is exposed to form at least part of a gas chamber without the gas supply layer. However, the practical dimension of the oxygen gas diffusion cathode is such that the cathode is frequently equipped in a large electrolytic cell having one meter cubes or more. A practical-scaled electrolytic cell is a lager one having a width of 2.4 meters and a height of 1.2 meters. When a metal foam or a metallic porous member is used as an electro-conductive porous member, a manufacturing process of the electrode is burdensome, is bad in its workability and mass-productivity and requires a larger amount of labor with respect to the increase of size and the mass-production. The metallic porous member is corroded after a long period of use, thereby deteriorating the electrode.

Patent Publication 5 describes an oxygen gas diffusion cathode composed of a porous electro-conductive substrate made of carbon material, and a catalyst layer, supported on the substrate, containing a hydrophilic catalyst consisting of silver or silver alloy and a hydrophobic binder. The oxygen gas diffusion cathode proposed by Patent publication 5 has settled the above problem of the mass-productivity by using carbon material selected from carbon cloth, carbon paper, carbon foam and sintered carbon for the porous electro-conductive substrate. However, there arises another problem of the reduction of the electrolysis performance due to the progress of agglomeration and peeling-off of the hydrophilic catalyst consisting of the silver or the silver alloy during the electrolysis or the emergency stop.

Although, on the other hand, Patent Publication 6 proposes a process of solving the problem mentioned in Patent Publication 5 by employing an oxygen gas diffusion cathode prepared by coating a catalyst consisting of silver and palladium on a porous electro-conductive substrate composed of silver, hydrophobic material and carbon material, the above process lacks the practicality because of the higher cost of the catalyst employing a larger amount of the expensive silver and palladium.

PRIOR ART PUBLICATIONS

Patent Publications

[Patent Publication 1] Japanese Patent Gazette No. 3553775
[Patent Publication 2] U.S. Patent Specification No. 4,486,276
[Patent Publication 3] Japanese Patent Laid-Open Gazette No. 5-311475
[Patent Publication 4] Japanese Patent Laid-Open Gazette No. 11-50289
[Patent Publication 5] Japanese Patent Laid-Open Gazette No. 2006-219694
[Patent Publication 6] Japanese Patent Laid-Open Gazette No. 2008-127631

Non-Patent Publications

[Non-Patent Publication 1] *Soda and Chlorine*, vol. 45, 85 (1994), 'Domestic and International Situations on Oxygen Cathode for Brine Electrolysis'

SUMMARY OF INVENTION

Problems to be Solved by Invention

As mentioned, the oxygen gas diffusion cathode employed in the practical-scaled electrolytic cell for brine electrolysis is required to have such characteristics that the increase in size and the mass-production are easily performed, the electrolysis performance is excellent which is maintained even after the repetition of the emergency stops, and the cost is low. While the oxygen gas diffusion cathodes which have been so far proposed satisfy some of these characteristics, none of them satisfies all of the characteristics.

While the electrodes proposed in Patent Publications 3 and 4 do not lower the electrolysis performance after the emergency stop, their mass-productivity and cost are not satisfactory. While the electrode proposed in Patent Publication 5 easily realizes its increase in size and mass-productivity, problems remain with respect to its stability on the emergency stop and its cost. While the electrode proposed in Patent Publication 6 easily realizes its increase in size and mass-productivity and does not lower the electrolysis performance after the emergency stop, it lacks practicality due to its extremely high cost.

As mentioned, the oxygen gas diffusion cathodes proposed so far have both advantages and disadvantages on the practical aspect. In order to supplement the disadvantages, it is easily conceivable to combine the characteristics of these electrodes. When, as shown, for example, in FIG. 3, a gas diffusion layer 3 and a reaction layer 4 which is positioned on the gas diffusion layer 3 proposed in Patent Publication 3 or 4 are coated and supported on a porous electro-conductive substrate 2 made of carbon material and proposed in Patent Publication 5, a less expensive oxygen gas diffusion cathode 1 can be produced which easily realizes its increase in size and mass-productivity, and does not lower the electrolysis performance after the emergency stop. In order to supply electricity to this oxygen gas diffusion cathode 1, the electricity is supplied through a current collector (not shown) →the electro-conductive substrate 2→the gas diffusion layer 3→the reaction layer 4→an ion exchange membrane (not shown) in this turn after the current collector is equipped on one surface of the electro-conductive substrate 2 opposite to the other surface of the electro-conductive substrate 2 on which the gas diffusion layer 3 and the reaction layer 4 are supported. However, the electro-conductive substrate 2 made of the carbon material is insufficient in its conductivity so that the electricity supplied from the current collector to the electro-conductive substrate 2 does not flow uniformly in the electro-conductive substrate 2 as shown with an arrow in FIG. 3, resulting in the supply of the non-uniform current to the gas diffusion layer 3 and the reaction layer 4. Accordingly, the electrolysis voltage thereof is higher than that of a conventional gas diffusion cathode to arise a new problem on inferior electrolysis characteristics. Only the combinations of the characteristic of the oxygen gas diffusion cathodes proposed so far cannot realize an electrode satisfying all the characteristics required.

An object of the present invention is to provide a less expensive oxygen gas diffusion cathode in which the increase in size and the mass-production are easily performed, and the electrolysis characteristics are excellent equally to those of the conventional electrodes, and the electrolysis performance isn't lowered after emergency stop. Another object of the present invention is to provide methods of producing chlorine gas and sodium hydroxide by electrolyzing brine by means of employing the above electrode, and an electrolytic cell for brine electrolysis equipped with the above electrode.

Means of Solving Problems

The oxygen gas diffusion cathode for brine electrolysis according to the present invention for solving the above problems comprises a porous electro-conductive substrate made of carbon material, a gas diffusion layer containing electro-conductive powders and hydrophobic resin, and a reaction layer containing electro-conductive powders, a hydrophilic catalyst and hydrophobic resin, both of which are positioned on one surface of the above electro-conductive substrate, and an electro-conductive layer containing metal powders and hydrophobic resin positioned on a surface opposite to the above one surface of the electro-conductive substrate. The filling rate of the above electrode in the present invention is preferably in a range from 20 to 50%. The metal powders in the electro-conductive layer and in the hydrophilic catalyst in the reaction layer of the present invention preferably consist of at least one noble metal selected from the group consisting of silver, platinum and palladium, and metal powders and hydrophilic catalyst may be the same as or different from each other. The electro-conductive powders in the reaction layer and in the gas diffusion layer are preferably made of carbon powders or carbon material on which at least one noble metal selected from silver, platinum and palladium is supported. An amount of the hydrophilic catalyst supported in the reaction layer is preferably from 10 to 100 $g/m^2$, an amount of the metal powders in the electro-conductive layer is preferably 10 $g/m^2$ or more, and a total metal amount of the hydrophilic catalyst in the reaction layer and the metal powders in the electro-conductive layer is preferably in a range from 20 to 300 $g/m^2$. The porous electro-conductive substrate made of carbon material of the present invention is preferably a piece of cloth or sintered fibers.

Effects of Invention

The present invention comprises the porous electro-conductive substrate made of carbon material; the gas diffusion layer containing the electro-conductive powders and the hydrophobic resin; and the reaction layer containing the electro-conductive powders, the hydrophilic catalyst and the hydrophobic resin, both of which are positioned on one surface of the above electro-conductive substrate; and the electro-conductive layer containing the metal powders and the hydrophobic resin and positioned on the surface opposite to the above surface of the electro-conductive substrate. Accordingly, while the desirable characteristics such that increase in size and the mass-production are easily performed, and the reduction of the electrolysis performance due to the emergency stop is not observed, the electric resistance of the porous electro-conductive substrate made of the carbon material can be decreased by mounting the electro-conductive layer, in contact with the current collector, on the rear side of the electrode of the present invention, thereby enabling the uniform current supply on the entire surface of the electrode.

EMBODIMENTS FOR IMPLEMENTING INVENTION

Figure 1:
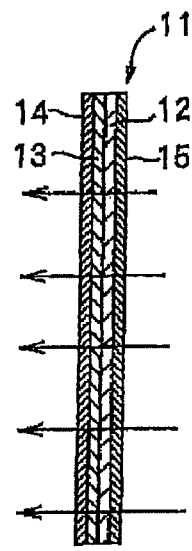
FIG. 1 A schematic vertical sectional view exemplifying a gas diffusion cathode of the present invention.

The components of configuring the oxygen gas diffusion cathode for brine electrolysis according to the present invention, and the process of producing the same will be described in detail.

Hydrophilic Catalyst

The hydrophilic catalyst employed in the oxygen gas diffusion cathode for brine electrolysis according to the present invention consists of at least one of silver, platinum and palladium which are electrochemically stable in a high temperature and high concentration alkaline solution. While these metals can be used as a single metal or metal alloy, it is practical to employ single silver, or silver-palladium alloy or silver-platinum alloy which is prepared by adding a small amount of the palladium or the platinum, respectively, to the silver in view of the cost. Commercially available particulate catalysts may be employed for the above hydrophilic catalyst. On the other hand, such the catalyst may be synthesized in accordance with known methods such as a wet method in which a nitric acid aqueous solution containing silver nitrate, or silver nitrate and palladium nitrate, or silver nitrate and dinitrodiammine platinum is mixed with a reducing agent, and a dry method including vapor deposition or sputtering, etc. The particle size of the hydrophilic catalyst can be from 0.001 to 50 microns with a preferable range from 0.001 to 1 micron.

A preferable range of supporting the hydrophilic catalyst used in the reaction layer of the present invention is from 10 to 100 $g/m^2$ for realizing the stability against the emergency stop operation. The reaction layer contains the hydrophilic catalyst, the electro-conductive powders and hydrophobic resin. When the amount of the hydrophilic catalyst is below 10 $g/m^2$, the exhaustion of the electro-conductive powders preferentially proceeds due to the emergency stop operation, thereby reducing the electrolysis performance. When, on the other hand, the amount of the hydrophilic catalyst exceeds 100 $g/m^2$, the agglomeration of the hydrophilic catalyst is likely to take place due to the emergency stop operation, thereby also reducing the electrolysis performance.

Electro-Conductive Powders

The electro-conductive powders used in the oxygen gas diffusion cathode for brine electrolysis according to the present invention are included in both of the gas diffusion layer and the reaction layer. The electro-conductive powders are made of carbon powders such as channel black, furnace black, lamp black, acetylene black, naturally-occurring graphite black and graphitized carbon powders which are relatively stable in a high temperature and high concentration alkaline solution and inexpensive. The particle size of the carbon particle is from 0.01 to 50 microns, and the preferable particle range is from 0.1 to 5 microns. While the electro-conductive powders are used to maintain the electro-conductivity of the entire electrode, electrode's filling rate is controlled by electro-conductive powder's amount of support, thereby realizing the excellent electrolysis performance. The electro-conductive powders used in the reaction layer contribute to improve a stability against the emergency stop operation by physically suppressing the agglomeration of the hydrophilic catalyst in addition to the above performance.

The electro-conductive powders are made of, in addition to the above, carbon powders on which fine powders composed of at least one of silver, platinum and palladium is dispersed and supported. Such electro-conductive powders are preferably used only in the reaction layer in view of their cost. While the commercially available carbon powders on which the above metal is supported can be used as the electro-conductive powders, they may be synthesized in according to publicly known methods, for example, after at least one of solutions of silver nitrate, palladium nitrate and dinitrodiammine platinum and the carbon powders are agitated and mixed, a reducing agent is added thereto for dispersing and supporting the metal on the carbon powders, followed by their use.

Since the electro-conductive powders support the fine powders composed of at least one of silver, platinum and palladium having the oxygen reducing ability on the carbon powders, they exhibit the excellent oxygen reducing ability even with a slight amount of the above catalyst metal and can suppress the agglomeration of the catalyst metal due to the emergency stop operation. Accordingly, when the electro-conductive powders are used in the reaction layer, the excellent electrolysis characteristics and the splendid stability against the emergency stop operation can be obtained, and since the amount of the hydrophilic catalyst supported can be reduced, the electrode cost can be also decreased.

Hydrophobic Resin

The hydrophobic resin used in the oxygen gas diffusion cathode for brine electrolysis of the present invention includes, for example, powders or a suspension aqueous solution made of such as commercially available PTFE, PFA, PVDF and FEP which is chemically stable in a high temperature and high concentration alkaline solution. The hydrophobic resin provides the sufficient gas permeability to the electrode, and contributes to keep a good electrolysis performance by preventing the flooding of the electrode by the sodium hydroxide produced. The preferable particle range thereof is from 0.005 to 10 microns.

Metal Powders

The metal powders used in the electro-conductive layer of the oxygen gas diffusion cathode for brine electrolysis of the present invention consists of, similarly to the hydrophilic catalyst, silver, platinum or palladium which is electrochemically stable in a high temperature and high concentration alkaline solution. Among these, silver which is relatively inexpensive is preferably used. While commercially available particles may be employed for the above metals powders, the particulate metal powders synthesized in accordance with a publicly known method such as a wet method in which a reducing agent is mixed with silver nitrate and a dry method including vapor deposition and sputtering can be used. The particle size of the metal powders is from 0.001 to 50 microns with its preferable range from 0.1 to 10 microns.

The present invention utilizes the metal powders in the electro-conductive layer, and a preferable amount of their supporting is 10 $g/m^2$ or more for realizing the excellent electrolysis performance. When the amount of the metal powders supported in the electro-conductive layer is below 10 $g/m^2$, the effects of reducing the electric resistance of the porous electro-conductive substrate made of carbon material and of supplying the uniform current through the entire electrode cannot be obtained, and the electrolysis voltage increases.

A preferable total metal amount of the hydrophilic catalyst and the metal powders of the oxygen gas diffusion cathode of the present invention is from 20 to 300 $g/m^2$. When the total metal amount is below 20 $g/m^2$, the support amount of the hydrophilic catalyst and/or the metal powders becomes below 10 $g/m^2$, and the stability against the emergency stop operation and/or the excellent electrolysis performance cannot be obtained. When the total metal amount exceeds 300 $g/m^2$, the oxygen gas diffusion cathode of practical use cannot be obtained in view of its cost.

Porous Electro-Conductive Substrate

While carbon materials such as a cloth, sintered fibers and foams are used for the porous electro-conductive substrate, either the cloth or the sintered fibers are preferably used in view of the ease of the increase in size and the mass-production, and the commercially available carbon cloth and the sintered fibers such as carbon paper can be utilized. Especially, the material subjected to the graphitization at high temperature is suitable because of its excellent electrochemical stability. Since the porous electro-conductive substrate of the present invention is required to pass oxygen and produced sodium hydroxide, it is requested to possess the appropriate porosity in addition to the sufficient electro-conductivity. A preferable pore diameter is from 0.001 to 1 mm, and a preferable porosity is from 30 to 95%. Thickness of the present electro-conductive substrate is suitably in a range from 0.1 to 1 mm in consideration of mechanical strength such as tensile strength and of a permeation distance of the oxygen and the produced sodium hydroxide.

Filling Rate

In accordance with the present invention, the permeability of the oxygen and the produced sodium hydroxide can be improved by controlling the filling rate of the present electrode in a range from 20 to 50%. Thereby, the excellent electrolysis performance comparable to that of a conventional oxygen gas diffusion cathode can be attained, and the total amount of the relatively expensive hydrophilic catalyst and metal powders among the constituents of the present oxygen gas diffusion cathode can be reduced by locally supporting them on the reaction layer and the electro-conductive layer so that a lower cost can be achieved.

In the oxygen gas diffusion cathode of the present invention, the excellent electrolysis performance is achieved by controlling the filling rate of the electrode in a range from 20 to 50%. The filling rate of the present invention is calculated by employing Equations (4) and (5). The filling rate below 20% cannot provide the excellent electrical contact among the hydrophilic catalyst, the electro-conductive powders, the metal powders and the porous electro-conductive substrate, thereby increasing the electrolysis voltage. The filling rate exceeding 50% increases the electrolysis voltage due to the prevention of the permeation of the oxygen and the produced sodium hydroxide.

Filling Rate (%)=[(Theoretical Volume of Materials Configuring Oxygen Gas Diffusion Cathode $(cm^3)$)/[(Thickness of Fabricated Oxygen Gas Diffusion Cathode (cm))×(Projected Area $(cm^2)$)]×100 (4)

Theoretical Volume $(cm^3)$=[(Amount of Supported Hydrophilic Catalyst (g))/(Density of Hydrophilic Catalyst $(g/cm^3)$)]+[(Amount of Supported Electro-Conductive Powders (g))/(Density of Electro-Conductive Powders $(g/cm^3)$)]+ [(Amount of Supported Hydrophobic Resin (g))/ (Density of Hydrophobic Resin $(g/cm^3)$)]+ [(Weight of Porous Electro-Conductive Substrate (g))/(Density of Porous Electro-Conductive Substrate $(g/cm^3)$)] (5)

Formation of Gas Diffusion Layer

The gas diffusion layer is formed by dispersing and mixing the electro-conductive powders and the hydrophobic resin, together with a dispersing agent and a thickener, in a solvent such as water or naphtha to prepare ink or paste which is then applied to the porous electro-conductive substrate followed by drying. In order to obtain the uniform gas diffusion layer, the applications and dryings are preferably performed in several separate operations. Any method of uniformly applying the ink or the paste configuring the gas diffusion layer to the porous electro-conductive substrate including a hand application by means of a brush or roller, and a mechanical application using such as a blade coater, a slot die coater and a gravure coater can be used.

Formation of Electro-Conductive Layer

The electro-conductive layer is formed by dispersing and mixing the metal powders and the hydrophobic resin, together with a dispersing agent and a thickener, in a solvent such as water and naphtha to prepare ink or paste which is then applied onto the surface opposite to the surface of the porous electro-conductive substrate on which the gas diffusion layer has been applied and supported followed by drying. The applications and the dryings are preferably performed in several separate operations. The above application method exemplified for the gas diffusion layer can be utilized. The electro-conductive layer is not necessarily formed uniformly on the entire electrode, and the striped or grid-shaped electro-conductive layer may be formed to reduce the amount of the metal powders in one preferable embodiment of the present invention.

Formation of Reaction Layer

The reaction layer was formed by dispersing and mixing the electro-conductive powders, the hydrophilic catalyst and the hydrophobic resin, together with a dispersing agent and a thickener, in a solvent such as water and naphtha to prepare ink or paste which was then applied on the surface of the gas diffusion layer followed by drying. In order to obtain the uniform reaction layer, the applications and dryings are preferably performed in several separate operations. The above application method exemplified for the gas diffusion layer can be utilized.

Sinter of Electrode

The porous electro-conductive substrate supporting the gas diffusion layer, the electro-conductive layer and the reaction layer includes the dispersing agent and the thickener in addition to the intended hydrophilic catalyst, electro-conductive powders, metal powders and hydrophobic resin. A thermal treatment is conducted for removing the dispersing agent and the thickener. The thermal treatment conditions include the sufficient temperature and length of time for volatizing or thermally decomposing the dispersing agent and the thickener to be removed provided that especially the hydrophobic resin among the intended support materials is neither volatized or thermally decomposed. The temperature and the length of time for the thermal treatment depend on the physical properties of the above materials. The temperature range from 100 to 400° C. and the length of time from 1 minute to 24 hours for the thermal treatment may be exemplified.

Compression of Electrode

The thermally treated porous electro-conductive substrate on which the gas diffusion layer, the electro-conductive layer and the reaction layer have been applied and supported is compressed such that the filling rate of the electrode is adjusted from 20 to 50% for obtaining the excellent electrolysis characteristics. The compression provides the excellent electrolysis characteristics by improving the electro-conductivity of the entire electrode by means of increasing the adhesiveness among the materials configuring the electrode and by adjusting the filling rate which is appropriate for the permeation of the oxygen and the produced sodium hydroxide. A pressing apparatus includes a mechanical pressing apparatus, a hydraulic pressing apparatus and a roller pressing apparatus. If the pressing plate or the roller thereof can be heated, the pressing apparatus may be used for the sinter and the compression of the electrode so that the sinter and the compression may be performed in separate steps or in the same step. The compression is conducted such that the filling rate of the electrode is adjusted from 20 to 50%. The pressure and the temperature are selected so as not to mechanically break down the electrode. When, for example, the carbon cloth is used for the porous electro-conductive substrate, the upper limit pressure is about 50 kgf/cm$^2$.

The oxygen gas diffusion cathode of the present invention can be obtained in accordance with the above production steps.

A structural example of the oxygen gas diffusion cathode of the present invention will be then described with reference to annexed drawings.

As shown in FIG. 1, an oxygen gas diffusion cathode 11 of the present invention is fabricated by forming a gas diffusion layer 13 composed of electro-conductive powders which are carbon powders and hydrophobic resin such as fluorine resin on one surface of a porous electro-conductive substrate 12 made of a carbon cloth or sintered carbon fibers, by forming a reaction layer 14 containing a hydrophilic catalyst selected from at least one of silver, platinum and palladium, electro-conductive powders which are carbon powders and hydrophobic resin such as fluorine resin on the gas diffusion layer 13, and further by forming an electro-conductive layer 15 containing metal powders of silver or silver alloy and hydrophobic resin such as fluorine resin positioned on a surface opposite to the above surface of the electro-conductive substrate 12. This oxygen gas diffusion cathode 11 is mounted town electrolytic cell for brine electrolysis as shown in FIG. 2, for example.

Example of Electrolytic Cell of Present Invention

Figure 2:
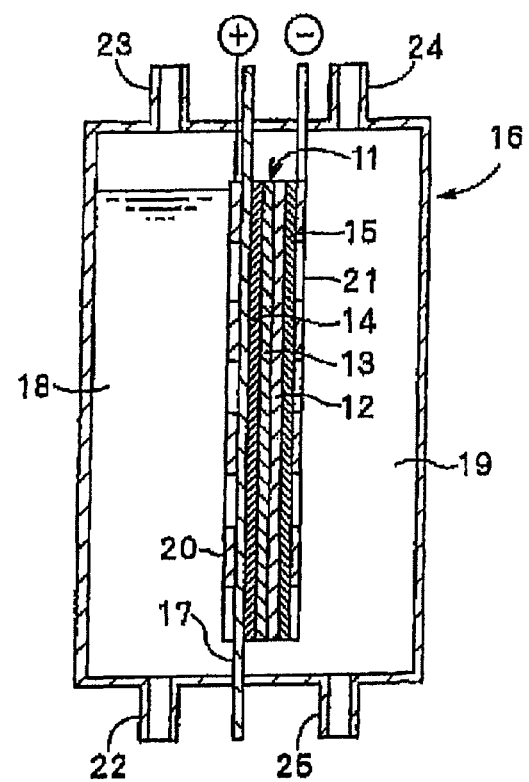
FIG. 2 A schematic vertical sectional view showing a brine electrolytic cell equipped with the gas diffusion cathode of FIG. 1.
Figure 3:
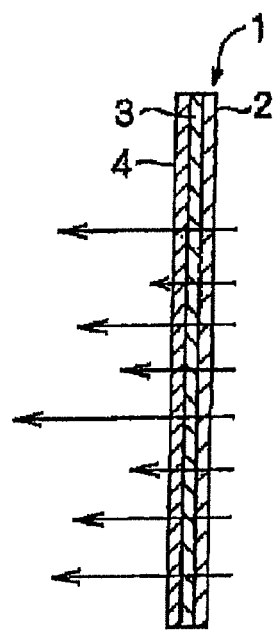
FIG. 3 A schematic vertical sectional view exemplifying a conventional gas diffusion cathode.

An electrolytic cell of the present invention is illustrated in FIG. 2.

As shown in FIG. 2, an electrolytic cell main body 16 for brine electrolysis is divided into an anode chamber 18 and a cathode chamber 19 by means of an ion exchange membrane 17. A mesh-shaped insoluble anode 20 in the anode chamber 18 is in intimate contact with the ion exchange membrane 17, and the reaction layer 14 of the oxygen gas diffusion cathode 11 as shown in FIG. 1 in the cathode chamber 19 is in intimate contact with the ion exchange membrane 17. Current is supplied to this oxygen gas diffusion cathode 11 through the current collector 21 connected to the electro-conductive layer 15. A numeral 22 denotes an anolyte inlet formed on an anode chamber bottom plate, a numeral 23 denotes an anolyte and gas outlet formed on an anode chamber top plate, a numeral 24 denotes an oxygen inlet formed on a cathode chamber top plate, and a numeral 25 denotes an oxygen and sodium hydroxide outlet formed on a cathode chamber bottom plate.

In the electrolytic cell of the present invention, an outlet of lower concentration brine which is connected to a circulation process of the anolyte brine may be equipped. A filter-press electrolytic cell composed of cathode (anode) elements for the brine electrolysis may be also employed.

Production of Chlorine Gas and Sodium Hydroxide by Means of Brine Electrolysis

Then, a method of brine electrolysis for producing chlorine gas and sodium hydroxide by employing the above electrolytic cell equipped with the electrode of the present invention will be illustrated with reference to FIG. 2. The method of the electrolysis of the present invention includes a method of producing the chlorine gas and a method of producing the sodium hydroxide.

When current is supplied between the both electrodes 11, 20 while brine and oxygen are supplied to the anode chamber 18 and the cathode chamber 19, respectively, of the electrolytic cell main body 16, the current in the cathode chamber flows from the current collector 21 through the electro-conductive layer 15, the electro-conductive substrate 12 and the gas diffusion layer 13 to the reaction layer 14 in this order, and the sodium hydroxide is produced on the cathode chamber 19 side surface of the ion exchange membrane 17 and permeates the oxygen gas diffusion cathode 11 in the form of an aqueous solution. The electro-conductive layer 15 positioned on the rear side of the electro-conductive substrate 12 with respect to the oxygen gas diffusion cathode 11 uniformly supplies the current coming from the current collector 21 to the gas diffusion layer 13 and to the reaction layer 14 of the oxygen gas diffusion cathode 11 (refer to the arrows in FIG. 1), thereby reducing the initial cell voltage.

In this manner, the sodium hydroxide passing through the oxygen gas diffusion cathode is collected to the bottom of the cathode chamber, and is taken out, together with unreacted oxygen, through the sodium hydroxide outlet 25. On the other hand, the chlorine gas generated on the surface of the anode 20 is collected to the top of the anode chamber and taken out through the chlorine gas outlet 23. In a practically preferable embodiment, the brine is electrolyzed by the use of a filter press electrolytic cell composed of a plurality of the unit electrolytic cells shown in FIG. 2 to produce the sodium hydroxide and the chlorine gas.

Although Examples of the production and the use of the oxygen gas diffusion cathode of the present invention will be described, the present invention shall not be restricted thereto.

Example 1

A gas diffusion layer was fabricated as follows.

Hydrophobic carbon black (AB-6, available from Denki Kagaku Kogyo Kabushiki Kaisha) and PTFE suspension aqueous solution (31JR available from Du Pont-Mitsui Fluorochemicals Co., Ltd) were mixed and sufficiently agitated in water dissolving Triton (registered trademark) equivalent to 20 wt % to prepare a mixed suspension liquid for the gas diffusion layer. The liquid was repeatedly applied and dried on a carbon cloth (available from Ballard Material Products, Inc.) having thickness of 0.4 mm until the weight of the gas diffusion layer per projected area reached 108 g/m$^2$.

Then, an electro-conductive layer was fabricated as follows.

Silver particles (AgC-H, available from Fukuda Metal Foil & Powder Co., Ltd.) and PTFE suspension aqueous solution (31JR available from Du Pont-Mitsui Fluorochemicals Co., Ltd) were mixed and sufficiently agitated in water dissolving 20% in weight of Triton and 1.5% in weight of carboxymethyl cellulose to prepare a mixed suspension liquid for the electro-conductive layer. The liquid was repeatedly applied and dried on a surface opposite to the above surface of the carbon cloth on which the gas diffusion layer having the thickness of about 0.5 mm was formed until an amount of the silver particles supported per projected area reached 160 g/m$^2$.

Finally, a reaction layer was fabricated as follows.

Hydrophobic carbon black (AB-6, available from Denki Kagaku Kogyo Kabushiki Kaisha), hydrophilic carbon black (AB-12, available from Denki Kagaku Kogyo Kabushiki Kaisha), silver particles (AgC-H, available from Fukuda Metal Foil & Powder Co., Ltd.) and PTFE suspension aqueous solution (31JR available from Du Pont-Mitsui Fluorochemicals Co., Ltd) were mixed and sufficiently agitated in water dissolving 20% in weight of Triton and 1.5% in weight of carboxymethyl cellulose to prepare a mixed suspension liquid for the reaction layer. The liquid was repeatedly applied and dried on the gas diffusion layer side of the carbon cloth on which the gas diffusion layer having the thickness of about 0.5 mm and the reaction layer were applied until an amount of the silver particles supported per projected area reached 46 g/m$^2$.

After the supporting of the reaction layer, the substrate was sintered in an electric furnace at 305° C. and for 15 minutes followed by compression at a pressure of 6 kgf/cm$^2$ and at ambient temperature for 10 minutes, thereby fabricating the oxygen gas diffusion cathode. The filling rate of the present oxygen gas diffusion cathode calculated in accordance with the above method of calculating the filling rate was 40%. A total amount of the silver particles acting as the hydrophilic catalyst and the silver particles acting as the metal powders was 206 g/m$^2$, and an amount of the supported electro-conductive powders was 150 g/m$^2$.

Since the carbon cloth was used for the porous electro-conductive substrate in the present oxygen gas diffusion cathode, the increase in size and the mass-production were easy. The total metal amount of the silver particles reached 206 g/m$^2$ so that the inexpensive electrode of practical use was obtained.

A steady electrolysis test and a short-circuit test discussed below were performed on the present oxygen gas diffusion cathode. An initial electrolysis voltage and an electrolysis voltage after the 150 day electrolysis obtained in the steady electrolysis test were taken as representatives of electrolysis performance. On the other hand, voltage increase after the short-circuit test was taken as a representative of stability of electrolysis performance against emergency stop operation.

(1) [Steady Electrolysis Test]

After an electrolytic cell for brine with an electrolysis area of 19 cm$^2$ was divided into an anode chamber and a cathode chamber by using an ion exchange membrane, Flemion 8020 manufactured by Asahi Glass Co., Ltd. (Flemion is a registered trademark.). DSE metal electrode containing ruthenium oxide as a main component manufactured by Permelec Electrode, Ltd. (DSE is a registered trade mark) was installed in the anode chamber and a hydrophilic layer and the oxygen gas diffusion cathode fabricated above were installed in the cathode chamber so that the DSE metal electrode, the ion exchange membrane, the hydrophilic layer and the oxygen gas diffusion cathode were positioned in this order from the anode chamber. The hydrophilic layer was prepared by hydrophilically treating a piece of carbon cloth with thickness of 0.4 mm.

After a current collector made of an elastic and porous metal was allowed to be in contact with the current-supplying surface of the oxygen gas diffusion cathode, the oxygen gas diffusion cathode was firmly pressed by using a cell pressing plate toward the DSE without any space through the hydrophilic layer and the ion exchange membrane, thereby assembling an electrolytic cell.

The electrolysis was conducted under the current density of 6 kA/m$^2$ while the brine concentration in the cathode chamber was adjusted such that the sodium hydroxide concentration produced was 32% in weight, the liquid temperature was adjusted to 90° C., and oxygen was supplied to the cathode chamber at a rate about 1.2 times its theoretical amount. Its initial cell voltage was 2.17 V. After 150 day operation, the cell voltage decreased to 2.15 V. During the operation, the current efficiency was maintained at about 95%.

The sodium hydroxide concentration in the aqueous solution sampled from the sodium hydroxide outlet 25 was 32%. The chlorine concentration in the chlorine gas sampled from the chlorine gas outlet 23 was 98.7% in volume.

(2) [Short-Circuit Test]

After the electrolysis was conducted for 10 days under the same electrolysis conditions and the same electrolytic cell configuration as those of the above steady electrolysis test, the brine supply to the anode chamber and the current supply were stopped, and the electrolytic cell was allowed to stand for one whole day and night with the anode and the cathode electrically short-circuited. Thereafter the brine supply to the anode chamber and the current supply were restarted to conduct the steady electrolysis. After these operations were repeated three times, the electrolysis voltage was measured. The voltage increase was 0 mV.

Example 2

An oxygen gas diffusion cathode was fabricated under the same conditions as those of Example 1 except that the amount of the silver particles supported per projected area in the reaction layer was 10 g/m$^2$ (the total metal amount was 170 g/m$^2$) and the filling rate was 34%. The increase in size and the mass-production of the present oxygen gas diffusion cathode were easy, and the cathode was a rather inexpensive electrode of practical use because the total metal amount of the silver particles was 170 g/m$^2$.

After the steady electrolysis test was conducted on the present oxygen gas diffusion cathode under the same conditions as those of Example 1, the initial electrolysis voltage was 2.19 V and the electrolysis voltage after the 150 day electrolysis was also 2.19 V. The sodium hydroxide concentration in the aqueous solution sampled from the sodium hydroxide outlet 25, and the chlorine concentration in the chlorine gas sampled from the chlorine gas outlet 23 were the same as those of Example 1. The voltage increase after the short-circuit test was 10 mV.

Example 3

An oxygen gas diffusion cathode was fabricated under the same conditions as those of Example 1 except that the amount of the silver particles supported per projected area in the reaction layer was 100 g/m$^2$ (the total metal amount was 260 g/m$^2$) and the filling rate was 34%. The increase in size and the mass-production of the present oxygen gas diffusion cathode were easy, and the cathode was a slightly expensive electrode of practical use because the total metal amount of the silver particles was 260 g/m$^2$.

After the steady electrolysis test was conducted on the present oxygen gas diffusion cathode under the same conditions as those of Example 1, the initial electrolysis voltage was 2.17 V and the electrolysis voltage after the 150 day electrolysis was also 2.17 V. The sodium hydroxide concentration in the aqueous solution sampled from the sodium hydroxide outlet 25, and the chlorine concentration in the chlorine gas sampled from the chlorine gas outlet 23 were the same as those of Example 1. The voltage increase after the short-circuit test was 0 mV.

Example 4

An oxygen gas diffusion cathode was fabricated under the same conditions as those of Example 1 except that silver-palladium alloy (Ag—Pd) was used in the reaction layer in place of the silver particles, the amount of the alloy supported per projected area in the reaction layer was 100 g/m² (the total metal amount was 260 g/m²) and the filling rate was 35%. The increase in size and the mass-production of the present oxygen gas diffusion cathode were easy, and the cathode was a slightly expensive electrode of practical use because the total metal amount of the silver-palladium alloy and the silver particles was 260 g/m².

After the steady electrolysis test was conducted on the present oxygen gas diffusion cathode under the same conditions as those of Example 1, the initial electrolysis voltage was 2.12 V and the electrolysis voltage after the 150 day electrolysis was also 2.12 V. The sodium hydroxide concentration in the aqueous solution sampled from the sodium hydroxide outlet 25, and the chlorine concentration in the chlorine gas sampled from the chlorine gas outlet 23 were the same as those of Example 1. The voltage increase after the short-circuit test was 0 mV.

Example 5

An oxygen gas diffusion cathode was fabricated under the same conditions as those of Example 1 except that silver-platinum alloy (Ag—Pt) was used in the reaction layer in place of the silver particles, the amount of the alloy supported per projected area in the reaction layer was 100 g/m² (the total metal amount was 260 g/m²) and the filling rate was 32%. The increase in size and the mass-production of the present oxygen gas diffusion cathode were easy, and the cathode was a slightly expensive electrode of practical use because the total metal amount of the silver-platinum alloy and the silver particles was 260 g/m².

After the steady electrolysis test was conducted on the present oxygen gas diffusion cathode under the same conditions as those of Example 1, the initial electrolysis voltage was 2.14 V and the electrolysis voltage after the 150 day electrolysis was 2.13 V. The sodium hydroxide concentration in the aqueous solution sampled from the sodium hydroxide outlet 25, and the chlorine concentration in the chlorine gas sampled from the chlorine gas outlet 23 were the same as those of Example 1. The voltage increase after the short-circuit test was 0 mV.

Example 6

An oxygen gas diffusion cathode was fabricated under the same conditions as those of Example 1 except that the amount of the silver particles supported per projected area in the electro-conductive layer was 10 g/m² (the total metal amount was 56 g/m²) and the filling rate was 33%. The increase in size and the mass-production of the present oxygen gas diffusion cathode were easy, and the cathode was a significantly inexpensive electrode of practical use because the total metal amount of the silver-platinum alloy and the silver particles was 56 g/m².

After the steady electrolysis test was conducted on the present oxygen gas diffusion cathode under the same conditions as those of Example 1, the initial electrolysis voltage was 2.17 V and the electrolysis voltage after the 150 day electrolysis was also 2.17 V. The sodium hydroxide concentration in the aqueous solution sampled from the sodium hydroxide outlet 25, and the chlorine concentration in the chlorine gas sampled from the chlorine gas outlet 23 were the same as those of Example 1. The voltage increase after the short-circuit test was 0 mV.

Example 7

An oxygen gas diffusion cathode was fabricated under the same conditions as those of Example 1 except that the amount of the silver particles supported per projected area in the electro-conductive layer was 200 g/m² (the total metal amount was 246 g/m²) and the filling rate was 35%. The increase in size and the mass-production of the present oxygen gas diffusion cathode were easy, and the cathode was a slightly expensive electrode of practical use because the total metal amount of the silver-platinum alloy and the silver particles was 246 g/m².

After the steady electrolysis test was conducted on the present oxygen gas diffusion cathode under the same conditions as those of Example 1, the initial electrolysis voltage was 2.17 V and the electrolysis voltage after the 150 day electrolysis was also 2.17 V. The sodium hydroxide concentration in the aqueous solution sampled from the sodium hydroxide outlet 25, and the chlorine concentration in the chlorine gas sampled from the chlorine gas outlet 23 were the same as those of Example 1. The voltage increase after the short-circuit test was 0 mV.

Example 8

An oxygen gas diffusion cathode was fabricated under the same conditions as those of Example 1 except that the filling rate was 20%. The increase in size and the mass-production of the present oxygen gas diffusion cathode were easy, and the cathode was an inexpensive electrode of practical use similar to the oxygen gas diffusion cathode of Example 1.

After the steady electrolysis test was conducted on the present oxygen gas diffusion cathode under the same conditions as those of Example 1, the initial electrolysis voltage was 2.20 V and the electrolysis voltage after the 150 day electrolysis was also 2.20 V. The sodium hydroxide concentration in the aqueous solution sampled from the sodium hydroxide outlet 25, and the chlorine concentration in the chlorine gas sampled from the chlorine gas outlet 23 were the same as those of Example 1. The voltage increase after the short-circuit test was 0 mV.

Example 9

An oxygen gas diffusion cathode was fabricated under the same conditions as those of Example 1 except that the filling rate was 50%. The increase in size and the mass-production of the present oxygen gas diffusion cathode were easy, and the cathode was an inexpensive electrode of practical use similar to the oxygen gas diffusion cathode of Example 1.

After the steady electrolysis test was conducted on the present oxygen gas diffusion cathode under the same conditions as those of Example 1, the initial electrolysis voltage was 2.18 V and the electrolysis voltage after the 150 day electrolysis was also 2.18 V. The sodium hydroxide concentration in the aqueous solution sampled from the sodium hydroxide outlet 25, and the chlorine concentration in the chlorine gas sampled from the chlorine gas outlet 23 were the same as those of Example 1. The voltage increase after the short-circuit test was 0 mV.

Comparative Example 1

An oxygen gas diffusion cathode was fabricated under the same conditions as those of Example 1 except that no silver particles were supported on the reaction layer (the total metal amount was 160 g/m²). The increase in size and the mass-production of the present oxygen gas diffusion cathode were easy, and the cathode was an inexpensive electrode of practical use because the total metal amount of the silver-platinum alloy and the silver particles was 160 g/m$^2$.

After the steady electrolysis test was conducted on the present oxygen gas diffusion cathode under the same conditions as those of Example 1, the initial electrolysis voltage was 2.20 V and the electrolysis voltage after the 150 day electrolysis was 2.30 V. The sodium hydroxide concentration in the aqueous solution sampled from the sodium hydroxide outlet 25, and the chlorine concentration in the chlorine gas sampled from the chlorine gas outlet 23 were the same as those of Example 1. The voltage increase after the short-circuit test was 200 mV.

Comparative Example 2

An oxygen gas diffusion cathode was fabricated under the same conditions as those of Example 1 except that the electro-conductive layer was not supported (the total metal amount was 46 g/m$^2$) and the filling rate was 30%. The increase in size and the mass-production of the present oxygen gas diffusion cathode were easy, and the cathode was a significantly inexpensive electrode of practical use because the total metal amount of the silver particles was 46 g/m$^2$.

After the steady electrolysis test was conducted on the present oxygen gas diffusion cathode under the same conditions as those of Example 1, the initial electrolysis voltage was 2.30 V and the electrolysis voltage after the 150 day electrolysis was 2.30 V. The sodium hydroxide concentration in the aqueous solution sampled from the sodium hydroxide outlet 25, and the chlorine concentration in the chlorine gas sampled from the chlorine gas outlet 23 were the same as those of Example 1. The voltage increase after the short-circuit test was 0 mV.

Comparative Example 3

Silver particles (AgC-H, available from Fukuda Metal Foil & Powder Co., Ltd.) and PTFE suspension aqueous solution (31JR available from Du Pont-Mitsui Fluorochemicals Co., Ltd) were mixed and sufficiently agitated in water dissolving 20% in weight of Triton and 1.5% in weight of carboxymethyl cellulose to prepare a mixed suspension liquid for the catalyst layer. The liquid was repeatedly applied and dried on a carbon cloth having thickness of 0.4 mm (available from Ballard Material Products, Inc.) until a weight of the silver particles supported per projected area reached 600 g/m$^2$.

The carbon cloth was sintered in an electric furnace at 305° C. and for 15 minutes followed by compression at a pressure of 6 kgf/cm$^2$ and ambient temperature and for 10 minutes, thereby fabricating the oxygen gas diffusion cathode. The filling rate of the present oxygen gas diffusion cathode calculated in accordance with the above method of calculating the filling rate was 37%. A total metal amount was 600 g/m$^2$, and an amount of the supported electro-conductive powders was 0 g/m$^2$. The increase in size and the mass-production of the present oxygen gas diffusion cathode were also easy because the carbon cloth was used for the porous electro-conductive substrate. However, the cathode was a significantly expensive electrode of no practical use because the total metal amount of the silver particles was 600 g/m$^2$.

After the steady electrolysis test was conducted on the present oxygen gas diffusion cathode under the same conditions as those of Example 1, the initial electrolysis voltage was 2.17 V and the electrolysis voltage after the 150 day electrolysis was 2.20 V. The sodium hydroxide concentration in the aqueous solution sampled from the sodium hydroxide outlet 25, and the chlorine concentration in the chlorine gas sampled from the chlorine gas outlet 23 were the same as those of Example 1. The voltage increase after the short-circuit test was 1000 mV.

Comparative Example 4

An oxygen gas diffusion cathode was fabricated under the same conditions as those of Example 1 except that a silver-plated porous nickel (porosity was 50 PPI) was used for the porous electro-conductive substrate, the electro-conductive layer was not supported (the total metal amount was 46 g/m$^2$) and the filling rate was 33%. The increase in size and the mass-production of the present oxygen gas diffusion cathode were difficult because the porous electro-conductive substrate was the silver-plated porous nickel. The cathode was a significantly expensive electrode with poor practicality.

After the steady electrolysis test was conducted on the present oxygen gas diffusion cathode under the same conditions as those of Example 1, the initial electrolysis voltage was 2.20 V and the electrolysis voltage after the 150 day electrolysis was also 2.14 V. The sodium hydroxide concentration in the aqueous solution sampled from the sodium hydroxide outlet 25, and the chlorine concentration in the chlorine gas sampled from the chlorine gas outlet 23 were the same as those of Example 1. The voltage increase after the short-circuit test was 0 mV.

The kinds and the weights of the noble metals of the hydrophilic catalyst and the metal powders, the total metal amounts, the amounts of the electro-conductive powders, the filling rates, the initial electrolysis voltages and the electrolysis voltages after the 150 day electrolysis of the steady electrolysis test, the voltage increase values after the short-circuit test, the ease of the increase in size and the mass-production, and the costs of the above Examples 1 to 9 and Comparative Examples 1 to 4 are summarized in Table 1. In Table 1, all the Ags are in the particulate form.

TABLE 1

| Example | Kind of Precious Metal (weight, g/m$^2$) | | Total Amount of Metal (g/m$^2$) | Electro-Conductive Powders (g/m$^2$) | Filling Rate (%) | Steady Electrolysis Test | | Voltage Increase After Short-Circuit Test (mV) | Increase in Size and Mass Productivity | Cost |
|---|---|---|---|---|---|---|---|---|---|---|
| | Hydrophilic Catalyst | Metal Powders | | | | Initial Electrolysis Voltage (V) | Electrolysis Voltage After 150 days (V) | | | |
| Ex. 1 | Ag 46 | Ag 160 | 206 | 150 | 40 | 2.17 | 2.15 | 0 | Easy | Inexpensive |
| Ex. 2 | Ag 10 | Ag 160 | 170 | 150 | 34 | 2.19 | 2.19 | 10 | Easy | Rather Inexpensive |
| Ex. 3 | Ag 100 | Ag 160 | 260 | 150 | 34 | 2.17 | 2.17 | 0 | Easy | Slightly |

TABLE 1-continued

| Example | Kind of Precious Metal (weight, g/m²) Hydrophilic Catalyst | Kind of Precious Metal (weight, g/m²) Metal Powders | Amount of Total Amount of Metal (g/m²) | Electro-Conductive Powders (g/m²) | Filling Rate (%) | Steady Electrolysis Test Initial Electrolysis Voltage (V) | Steady Electrolysis Test Electrolysis Voltage After 150 days(V) | Voltage Increase After Short-Circuit Test (mV) | Increase in Size and Mass Productivity | Cost |
|---|---|---|---|---|---|---|---|---|---|---|
| Ex. 4 | Ag—Pd 100 | Ag 160 | 260 | 150 | 35 | 2.12 | 2.12 | 0 | Easy | Expensive |
| Ex. 5 | Ag—Pt 100 | Ag 160 | 260 | 150 | 32 | 2.14 | 2.13 | 0 | Easy | Slightly Expensive |
| Ex. 6 | Ag 46 | Ag 10 | 56 | 150 | 33 | 2.17 | 2.17 | 0 | Easy | Slightly Expensive |
| Ex. 7 | Ag 46 | Ag 200 | 246 | 150 | 35 | 2.17 | 2.17 | 0 | Easy | Significantly Inexpensive |
| Ex. 8 | Ag 46 | Ag 160 | 206 | 150 | 20 | 2.20 | 2.20 | 0 | Easy | Slightly Expensive |
| Ex. 9 | Ag 46 | Ag 160 | 206 | 150 | 50 | 2.18 | 2.18 | 0 | Easy | Inexpensive |
| Comp. Ex. 1 | Ag 0 | Ag 160 | 160 | 150 | 40 | 2.20 | 2.30 | 200 | Easy | Rather Inexpensive |
| Comp. Ex. 2 | Ag 46 | Ag 0 | 46 | 150 | 30 | 2.30 | 2.30 | 0 | Easy | Slgnificantly Inexpensive |
| Comp. Ex. 3 | | Ag 600 | 600 | 0 | 37 | 2.17 | 2.20 | 1000 | Easy | Slgnificantly Expensive |
| Comp. Ex. 4 | Ag 46 | Ag 0 | 46 | 150 | 33 | 2.20 | 2.14 | 0 | Difficult | Slgnificantly Expensive |

Effects of Hydrophilic Catalyst

The comparison between Comparative Example 1 and Examples 1 to 3 reveals that both of the initial electrolysis voltages and the electrolysis voltages after the 150 day electrolysis are increased and further the voltage increase after the short-circuit test is high when no hydrophilic catalyst is present in the reaction layer so that the hydrophilic catalyst is essential for obtaining the excellent electrolysis performance and the stability against the emergency stop operation.

The comparison between Examples 4 and 5 and Example 3 reveals that the use of Ag—Pd or Ag—Pt for the hydrophilic catalyst of the reaction layer reduces the initial electrolysis voltages and the electrolysis voltages after the 150 day electrolysis so that Examples 4 and 5 are preferable embodiments for achieving the excellent electrolysis performance.

Effects of Electro-Conductive Layer

The comparison between Comparative Example 2 and Examples 1, 6 and 7 reveals that the initial electrolysis voltages and the electrolysis voltages after the 150 day electrolysis are high when no electro-conductive layer is present so that the electro-conductive layer is essential for obtaining the excellent electrolysis performance.

Effects of Electro-Conductive Powders

The comparison between Comparative Example 3 and Examples 1 to 9 reveals that the electrolysis voltage increases after the short-circuit test are high when no electro-conductive powders are used and the porous electro-conductive substrates made of carbon material are used so that the electro-conductive powders are essential for obtaining the stability against the emergency stop operation.

DESCRIPTION OF SYMBOLS

11 Oxygen gas diffusion cathode
12 Porous electro-conductive substrate
13 Gas diffusion layer
14 Reaction layer
15 Electro-conductive layer
16 Electrolytic cell main body for brine
17 Ion exchange membrane
18 Anode chamber
19 Cathode chamber
20 Insoluble anode
21 Current collector
22 Anolyte inlet
23 Gas outlet
24 Oxygen inlet
25 Oxygen and sodium hydroxide outlet

The invention claimed is:

1. An oxygen gas diffusion cathode for brine electrolysis comprising:
   a porous electro-conductive substrate made of carbon material;
   a gas diffusion layer containing hydrophobic resin and electro-conductive powders made of carbon powders, and a reaction layer containing electro-conductive powders made of carbon powders, a hydrophilic catalyst consisting of at least one noble metal selected from the group consisting of silver, platinum and palladium, and hydrophobic resin, both of which are positioned on one surface of the above electro-conductive substrate; and
   an electro-conductive layer containing metal powders consisting of at least one noble metal selected from the group consisting of silver, platinum and palladium and hydrophobic resin and positioned on a surface opposite to the above one surface of the electro-conductive substrate.

2. The oxygen gas diffusion cathode for brine electrolysis as claimed in claim 1, wherein on the electro-conductive powders made of carbon powders in the reaction layer and the gas diffusion layer, powders composed of at least one noble metal selected from the group consisting of silver, platinum and palladium are dispersed and supported.

3. The oxygen gas diffusion cathode for brine electrolysis as claimed in claim 1, wherein the porous electro-conductive substrate made of carbon material is either a piece of cloth or sintered fibers.

4. The oxygen gas diffusion cathode for brine electrolysis as claimed in claim 1, wherein an amount of the hydrophilic catalyst in the reaction layer is from 10 to 100 $g/m^2$.

5. The oxygen gas diffusion cathode for brine electrolysis as claimed in claim 1, wherein an amount of the metal powders in the electro-conductive layer is 10 $g/m^2$ or more.

6. The oxygen gas diffusion cathode for brine electrolysis as claimed in claim 1, wherein a total metal amount of the hydrophilic catalyst in the reaction layer and the metal powders in the electro-conductive layer is from 20 to 300 $g/m^2$.

7. An electrolytic cell for brine electrolysis with the oxygen gas diffusion cathode as claimed in claim 1.

8. A method of producing chlorine gas by electrolyzing brine with the oxygen gas diffusion cathode for brine electrolysis as claimed in claim 1.

9. A method of producing sodium hydroxide by electrolyzing brine with the oxygen gas diffusion cathode for brine electrolysis as claimed in claim 1.

10. The oxygen gas diffusion cathode for brine electrolysis as claimed in claim 1, further comprising a current collector in contact with the electro-conductive layer.

\* \* \* \* \*